(12) United States Patent
Daval

(10) Patent No.: US 9,193,220 B2
(45) Date of Patent: Nov. 24, 2015

(54) TIRE WITH IMPROVED BEADS

(75) Inventor: Bertrand Daval, Clermont-Ferrand (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 591 days.

(21) Appl. No.: 13/141,689

(22) PCT Filed: Dec. 21, 2009

(86) PCT No.: PCT/EP2009/067697
§ 371 (c)(1),
(2), (4) Date: Dec. 13, 2011

(87) PCT Pub. No.: WO2010/072737
PCT Pub. Date: Jul. 1, 2010

(65) Prior Publication Data
US 2012/0073723 A1 Mar. 29, 2012

Related U.S. Application Data

(60) Provisional application No. 61/174,294, filed on Apr. 30, 2009.

(30) Foreign Application Priority Data

Dec. 22, 2008 (FR) .................................. 08 58898

(51) Int. Cl.
*B60C 15/06* (2006.01)
*B60C 15/00* (2006.01)

(52) U.S. Cl.
CPC ............ *B60C 15/06* (2013.01); *B60C 15/0607* (2013.04); *B60C 2015/009* (2013.04); *B60C 2015/0621* (2013.04); *Y10T 152/10837* (2015.01)

(58) Field of Classification Search
CPC B60C 15/06; B60C 15/0603; B60C 15/0607; B60C 2015/061; B60C 2015/0617; B60C 2015/0621; B60C 2015/009; Y10T 152/10819; Y10T 152/10837
USPC ................................ 152/541, 546, 547, 539
See application file for complete search history.

(56) References Cited

U.S. PATENT DOCUMENTS 5,526,863 A * 6/1996 Hodges ..................... 152/541

FOREIGN PATENT DOCUMENTS

| EP | 0 924 108 | 6/1999 |
|---|---|---|
| EP | 0 947 358 | 10/1999 |
| JP | 09 011715 | 1/1997 |

*Primary Examiner* — Justin Fischer
*Assistant Examiner* — Philip N Schwartz
(74) *Attorney, Agent, or Firm* — Cozen O'Connor

(57) ABSTRACT

Tire comprising two beads (20), two sidewalls (30) joining in a crown, and at least one carcass reinforcement (60) extending from the beads through the sidewalls to the crown, the carcass reinforcement being anchored in the two beads by a turn-up around an annular reinforcing structure in such a way as to form in each bead an incoming portion (61) and a wrapped-around portion (62), wherein each bead comprises a bead filler (110) and an outer band (120), the latter being placed axially outside of both the carcass reinforcement and the bead filler, wherein the assembly formed by the bead filler (110) and the outer band (120) has a thickness E(r), r being the distance to the radially innermost point (71) of the annular reinforcing structure, the thickness E(r) at different positions being such that, in the range of distances r greater than or equal to 15% and smaller than or equal to 50% of the radial height H of the tire, the variation of the thickness is less than or equal to −0.25 mm/mm over at least 5 mm.

12 Claims, 6 Drawing Sheets

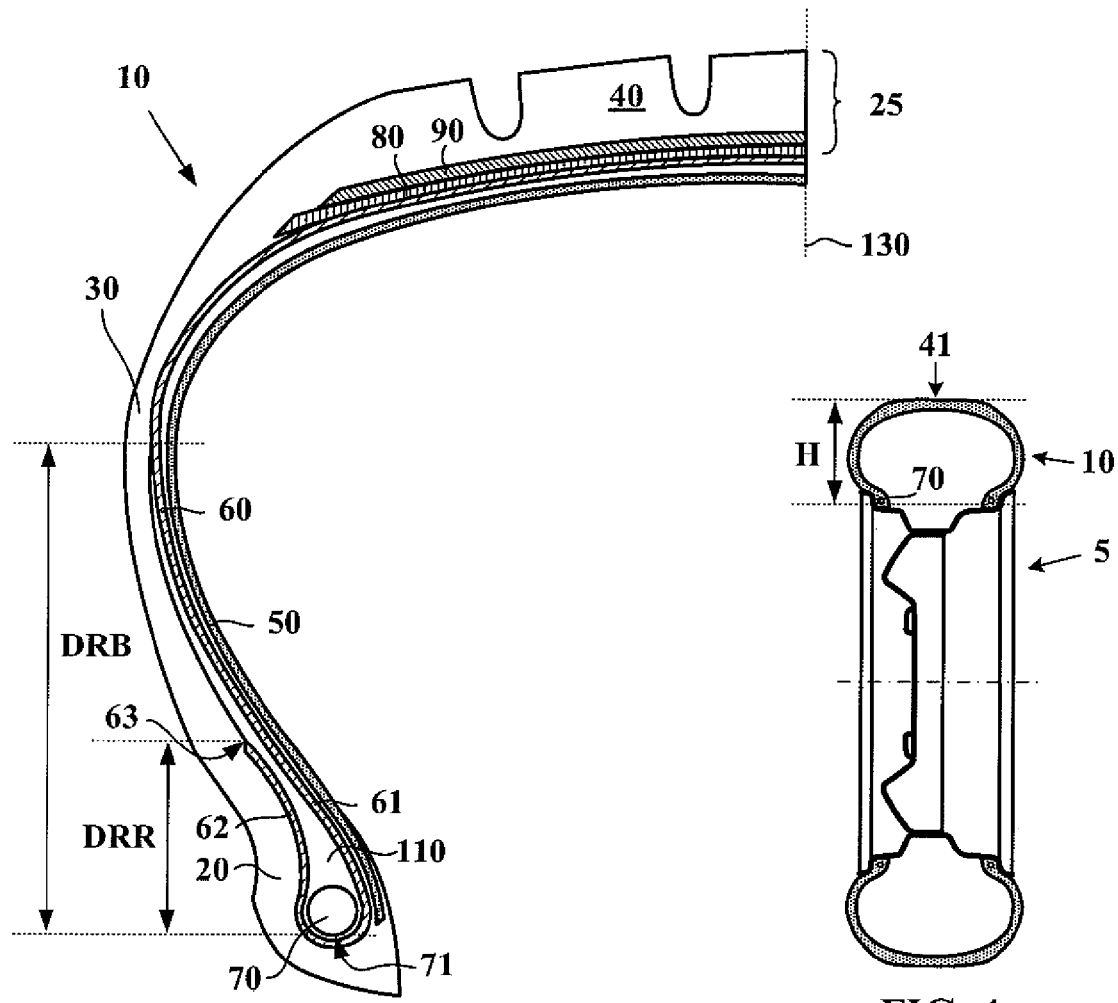
FIG. 3
(PRIOR ART)
FIG. 4
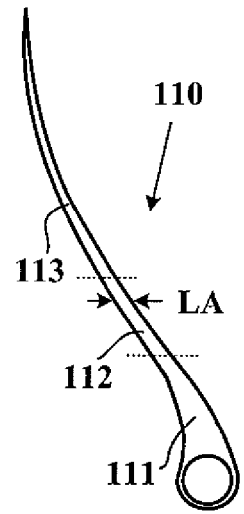
FIG. 5

TIRE WITH IMPROVED BEADS

RELATED APPLICATIONS

This is a U.S. National Phase Application under 35 USC 371 of International Application PCT/EP2009/067697, filed on Dec. 21, 2009.

This application claims the priority of French patent application no. 08/58898 filed Dec. 22, 2008 and U.S. provisional patent application No. 61/174,294 filed Apr. 20, 2009, the entire content of both of which are hereby incorporated by reference.

FIELD OF THE INVENTION

This invention relates to tires for passenger vehicles, and especially to the beads of these tires.

BACKGROUND

Tires for passenger vehicles usually comprise:

two beads designed to be in contact with a wheel rim, each bead comprising at least one annular reinforcing structure and a bead filler, the bead filler being located radially outside of the annular reinforcing structure;

two sidewalls extending the beads radially toward the outside, the two sidewalls joining in a crown comprising a crown reinforcement surmounted by a tread;

at least one carcass reinforcement extending from the beads through the sidewalls to the crown, and comprising a plurality of carcass reinforcing elements. Very often the carcass reinforcement is anchored in the two beads by a turn-up around the annular reinforcing structure in such a way as to form in each bead an "incoming portion" and a "wrapped-around portion". The bead filler is located at least partially between the incoming portion and the wrapped-around portion of the carcass reinforcement.

Document U.S. Pat. No. 5,526,863 teaches the provision of a special bead, with the object of reducing the mass of the bead and improving the rolling resistance of such a tire. The tire disclosed in that document comprises a bead filler comprising:

a first part of tapered radial section, this first part becoming progressively thinner radially toward the outside before turning into a second part with a radial section that has an approximately constant width, the second part being located radially outside of the first part and turning into a third part with a radial section that tapers off, the third part being situated radially outside of the second part.

The bead filler extends radially outside of the radially innermost point of the annular reinforcing structure of the bead as far as a radial distance from the said point that is greater than or equal to 30% of the radial height H of the tire.

Each bead also comprises an outer band placed axially outside of both the carcass reinforcement and the bead filler. This outer band extends radially toward the outside, from a radially inner end located at a distance less than or equal to 20% of the radial height H of the tire from the radially innermost point of the annular reinforcing structure of the bead, as far as a radially outer end, and the radial distance from the radially outer end of the outer band to the radially inner end of the outer band being greater than or equal to 40% of the radial height H of the tire.

Since that patent, the oil price rise and the awakening of consumers' ecological consciences have further increased the need to reduce tire rolling resistance, as the latter has a direct impact on fuel consumption. Thus, the reduction of rolling resistance obtained with a tire according to document U.S. Pat. No. 5,526,863 is no longer sufficient.

SUMMARY OF THE INVENTION

One of the objects of the present invention is to provide a passenger vehicle tire having a very low rolling resistance.

This object is achieved with a tire comprising:

two beads designed to be in contact with a wheel rim, each bead comprising at least one annular reinforcing structure;

two sidewalls extending the beads radially toward the outside, the two sidewalls joining in a crown comprising a crown reinforcement surmounted by a tread;

at least one carcass reinforcement extending from the beads through the sidewalls to the crown, the carcass reinforcement comprising a plurality of carcass reinforcing elements and being anchored in the two beads by a turn-up around the annular reinforcing structure in such a way as to form in each bead an incoming portion and a wrapped-around portion, each wrapped-around portion extending radially toward the outside, to an end located at a radial distance DRR from the radially innermost point of the annular reinforcing structure of the bead, and the radial distance DRR being greater than or equal to 15% of the radial height H of the tire.

Each bead has a bead filler, the bead filler being located radially outside of the annular reinforcing structure and at least partly between the incoming portion and the wrapped-around portion of the carcass reinforcement. The bead filler extends radially outside of the radially innermost point of the annular reinforcing structure of the bead as far as a radial distance DRB from said point, the radial distance DRB being greater than or equal to 20% of the radial height H of the tire.

Each bead also comprises an outer band placed axially outside of both the carcass reinforcement and the bead filler, each outer band extending radially toward the outside, from a radially inner end located at a distance DRI from the radially innermost point of the annular reinforcing structure of the bead, DRI being less than or equal to 20% of the radial height H of the tire, as far as a radially outer end situated radially outside of the radially innermost point of the annular reinforcing structure of the bead, the radial distance DRL from the radially outer end of the outer band to the radially inner end of the outer band being greater than or equal to 25% (and preferably greater than or equal to 30%) of the radial height H of the tire.

The assembly formed by the bead filler and the outer band has, in any radial section, a thickness $E(r)$, this thickness corresponding to the length of the intersection of the direction perpendicular to the incoming portion of the carcass reinforcement with said assembly, r being the distance from the intersection of said direction perpendicular to the incoming portion of the carcass reinforcement with the carcass reinforcement to the radially innermost point of the annular reinforcing structure. The thickness $E(r)$ changes as a function of the distance r such that, in the range of distances r greater than or equal to 15% and smaller than or equal to 50% of the radial height H of the tire (or alternatively in the range of distances r greater than or equal to 20 mm and smaller than or equal to 50 mm), the variation of the thickness $$\frac{\partial E(r)}{\partial r}$$

is less than or equal to −0.25 mm/mm (and preferably less than or equal to −0.3 mm/mm) over at least 5 mm.

In an advantageous embodiment, the aspect ratio Emax/DRL, where Emax is the maximum width of the outer band measured at right angles to the incoming portion of the carcass reinforcement, and where DRL is the radial height of the outer band, is greater than or equal to 10%.

In one particular embodiment, the bead filler comprises:

a first part of tapered radial section, this first part becoming progressively thinner radially toward the outside before turning into a second part with a radial section that has an approximately constant width, the second part being located radially outside of the first part and turning into a third part with a radial section that tapers off, the third part being situated radially outside of the second part.

BRIEF DESCRIPTION OF THE DRAWINGS

FIG. 3 is a radial section through a quarter of a tire according to the prior art.

FIG. 4 shows how the height H of a tire is determined.

FIG. 5 shows a detail of FIG. 3.

DETAILED DESCRIPTION OF THE DRAWINGS

When the term "radial" is used, it is important to distinguish between several different uses of the word among those skilled in the art. Firstly, the expression refers to a radius of the tire. It is in this sense that a point P1 is said to be "radially inside" of a point P2 if it is nearer than point P2 to the axis of rotation of the tire. Conversely, a point P3 is said to be "radially outside" of a point P4 if it is further than point P4 from the axis of rotation of the tire. When radial distances are being discussed, this meaning of the term also applies. "Radially toward the inside" means toward smaller radii; "radially toward the outside" means toward greater radii.

However, a thread or reinforcement is said to be "radial" when the thread or reinforcing elements of the reinforcement form with the circumferential direction an angle greater than or equal to 80° and less than or equal to 90°. It should be noted that in this document the term "thread" is to be interpreted in the broadest sense and comprises threads in the form of monofilaments, multifilaments, a cable, a yarn or an equivalent assembly, and this irrespective of the material of the thread or the coating applied to it in order to enhance its bonding with the rubber.

Lastly, "radial section" here means a section taken along a plane containing the axis of rotation of the tire.

An "axial" direction is a direction parallel to the axis of rotation of the tire. A point P5 is said to be "axially inside" of a point P6 if it is closer than point P6 to the mid plane of the tire. Conversely, a point P7 is said to be "axially outside" of a point P8 if it is further than point P8 from the mid plane of the tire. The "mid plane" of the tire is that plane which is perpendicular to the axis of rotation of the tire and is equidistant from the annular reinforcing structures of each bead.

A "circumferential" direction is a direction that is perpendicular both to a radius of the tire and to the axial direction.

A "hooping reinforcement" or "hooping layer", also known as a "bracing layer", is a layer comprising circumferentially aligned reinforcing threads (similar to hoops) which hinder the crown reinforcement from expanding when the tire is rolling at high speed.

For the purposes of this document, the expression "rubber compound" means a rubber composition comprising at least one elastomer and at least one filler.

Figure 1:
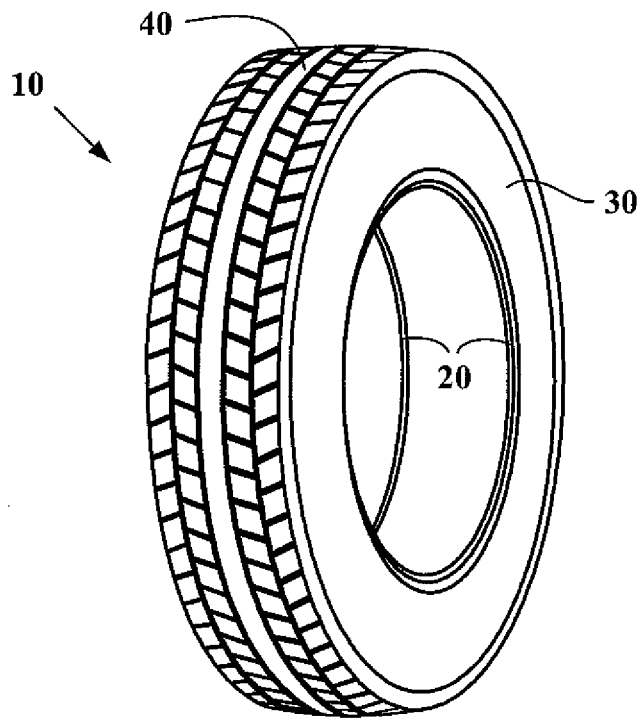
FIG. 1 shows a tire according to the prior art.

FIG. 1 is a diagram of a tire 10 according to the prior art. The tire 10 has a crown comprising a crown reinforcement (not visible in FIG. 1) surmounted by a tread 40; two sidewalls 30 extending from the crown radially toward the inside; and two beads 20 located radially inside of the sidewalls 30.

Figure 2:
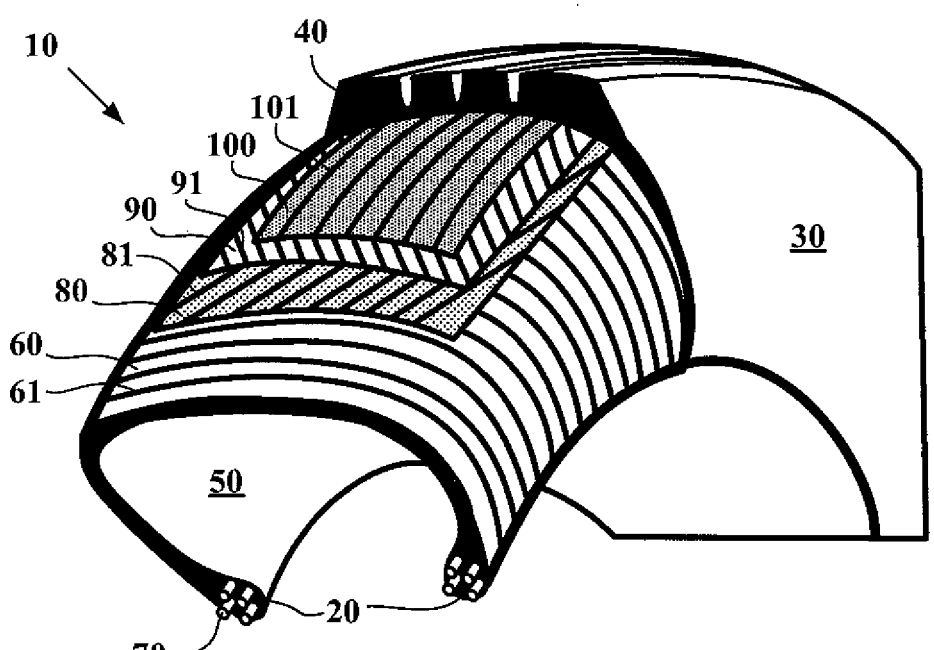
FIG. 2 is a partial perspective view of a tire according to the prior art.

FIG. 2 shows diagrammatically a partial perspective view of a tire 10 according to the prior art and shows the various components of the tire. The tire 10 comprises a carcass reinforcement 60 consisting of threads 61 coated in rubber compound, and two beads 20, each comprising annular reinforcing structures 70 that keep the tire 10 on the wheel rim (not shown). The carcass reinforcement 60 is anchored to each of the beads 20. The tire 10 also has a crown reinforcement comprising two plies 80 and 90. Each ply 80, 90 is reinforced with filamentary reinforcing elements 81 and 91 that are parallel in each layer and crossed from one layer to the other, making with the circumferential direction angles of between 10° and 70°. The tire also contains a hooping reinforcement 100 which is laid radially outside of the crown reinforcement. This hooping reinforcement is made up of reinforcing elements 101 oriented circumferentially and wound in a spiral. A tread 40 is laid on the hooping reinforcement; it is this tread 40 which provides the contact between the tire 10 and the road. The tire 10 illustrated is a "tubeless" tire: it comprises an inner liner 50 made of a rubber composition impermeable to the inflation gases and covering the inside surface of the tire.

FIG. 3 shows diagrammatically, in radial section, a quarter of a tire 10 according to the prior art. The tire 10 has two beads 20 designed to be in contact with a wheel rim (not shown), each bead 20 comprising at least one annular reinforcing structure, in this case a bead wire 70. Two sidewalls 30 extend the beads 20 radially toward the outside and join in a crown 25 comprising a crown reinforcement made up of a first layer of reinforcements 80 and a second layer of reinforcements 90, with a tread 40 surmounting them radially. Each layer of reinforcements comprises filamentary reinforcements coated in a matrix of rubber compound. The reinforcements in each layer of reinforcements are approximately parallel to each other, while the reinforcements of the two layers are crossed from one layer to the other at an angle of approximately 20°, as is well known to those skilled in the art of so-called radial tires.

The tire 10 also has a carcass reinforcement 60 that extends from the beads 20 along the sidewalls 30 to the crown 25. This carcass reinforcement 60 here comprises filamentary reinforcements oriented approximately radially, meaning that they form with the circumferential direction an angle greater than or equal to 80° and less than or equal to 90°.

The carcass reinforcement 60 comprises a plurality of carcass reinforcing elements anchored in the two beads 20 by a turn-up around the bead wire 70, in such a way as to form in each bead an incoming portion 61 and a wrapped-around portion 62. The boundary between the incoming portion 61 and the wrapped around portion 62 is considered to lie at the intersection of the carcass reinforcement 60 with a plane perpendicular to the axis of rotation of the tire and containing the radially innermost point of the carcass reinforcement 60 in the bead. The wrapped-around portion extends radially toward the outside, to an end 63 which lies at a radial distance DRR from the radially innermost point 71 of the annular reinforcing structure of the bead, the radial distance DRR being greater than or equal to 15% of the radial height H of the tire.

The "radial height" H of a tire is defined as the radial distance from the radially innermost point 71 of the annular reinforcing structure 70 of the bead 20 to the radially outermost point 41 (FIG. 4) of the tread 40 when the tire 10 is mounted on a wheel rim 5 (as depicted in FIG. 4) and inflated to its service pressure.

Each bead comprises a bead filler 110, the bead filler being situated radially on the outside of the bead wire 70, a large part of it being situated between the incoming portion 61 and the wrapped-around portion 62 of the carcass reinforcement 60.

FIG. 5 shows the bead filler of the tire seen in FIG. 3. The bead filler comprises a first part 111 of tapered radial section. This first part 111 becomes progressively thinner radially toward the outside before turning into a second part 112 where its radial section has an approximately constant axial width LA, in the sense that it varies by less than 5% along the length of the second part 112. The second part is located radially outside of the first part 111 and turns into a third part 113 with a radial section that tapers off, this third part being situated radially outside of the second part 112.

The bead filler 110 extends radially outside the radially innermost point 71 of the annular reinforcing structure of the bead, as far as a radial distance DRB from said radially innermost point, the radial distance DRB being greater than or equal to 20% of the radial height H of the tire. In the present case the bead filler 110 extends all the way to the equator of the tire. For the purposes of the present document, the "equator" of the tire is the radial height of the point of greatest axial extension of the carcass reinforcement. In a radial section through the tire, the equator appears as the straight axial line passing through the points where the carcass reinforcement has its greatest axial width when the tire is fitted on the wheel rim and inflated. When the carcass reinforcement reaches this greatest axial width at several points, the radial height of the closest point to the mid-height H/2 of the tire is taken to be the equator of the tire. The equator thus defined must not be confused with the mid plane 130 of the tire, which is also sometimes called the "equator" in prior art documents. DRB is preferably chosen such that the bead filler does not extend radially outside of the equator of the tire.

The inside surface of the tire 10 is covered with an inner liner 50.

Figure 6:
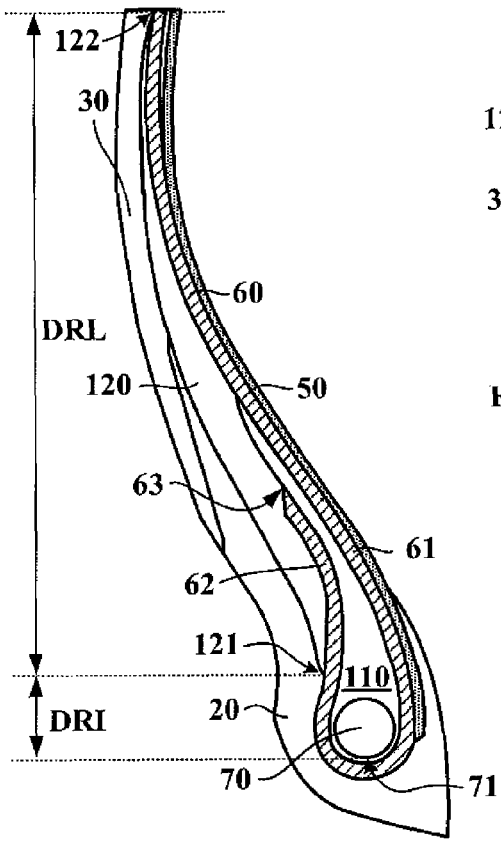
FIGS. 6 to 8 are radial sections through a portion of a tire according to an embodiment of the invention.

It is also known practice to provide an outer band 120 placed axially outside of both the carcass reinforcement and the bead filler, as in the tire shown in FIG. 6. Each outer band extends radially toward the outside, from a radially inner end 121 situated at a radial distance DRI from the radially innermost point 71 of the annular reinforcing structure 70 of the bead, DRI being less than or equal to 20% of the radial height H of the tire, as far as a radially outer end 122, the radial distance DRL between the radially outer end 122 of the outer band and the radially inner end 121 of the outer band being greater than or equal to 25% (and preferably greater than or equal to 30%) of the radial height H of the tire.

It is an object of the present invention to provide a tire for a passenger vehicle having less rolling resistance than prior art tires, such as the tire shown in FIG. 3.

Figure 7:
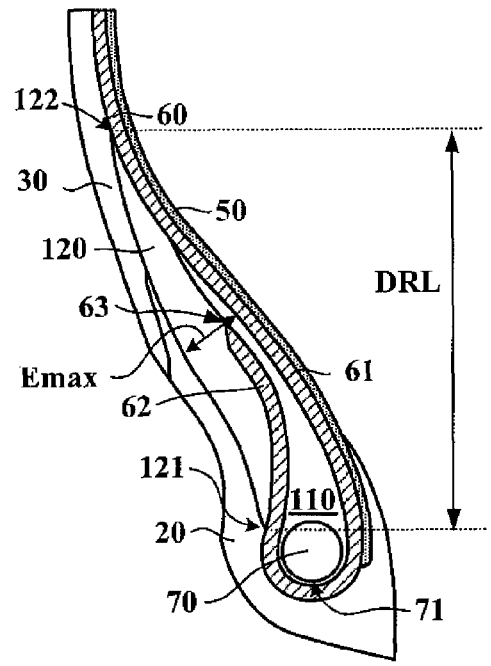
Figure 8:
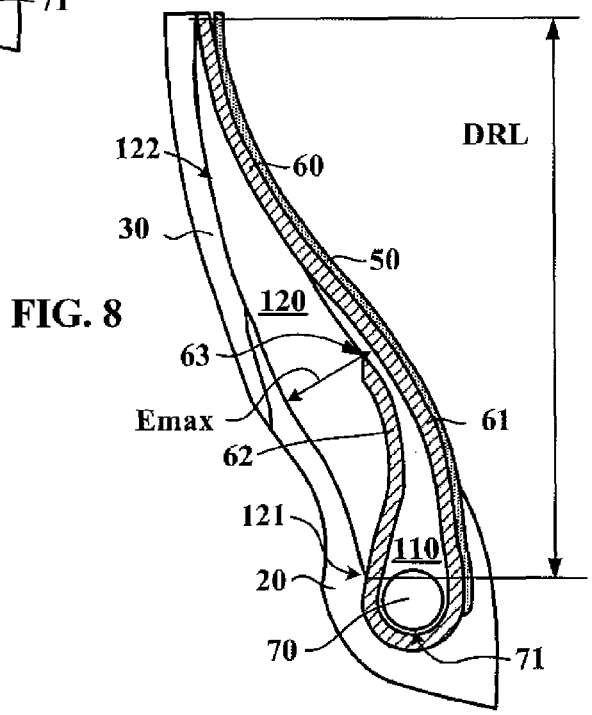

This object is achieved with a tire comprising an outer band 120 that is "chunkier", that is to say shorter and wider, like the tires shown in FIGS. 7 and 8. The advantage of using this sort of outer band is that it reduces the rolling resistance of the tire.

These embodiments can be characterized in a number of different ways. One way is to consider the thickness E(r), in any radial section, of the assembly formed by the bead filler and the outer band.

Figure 9:
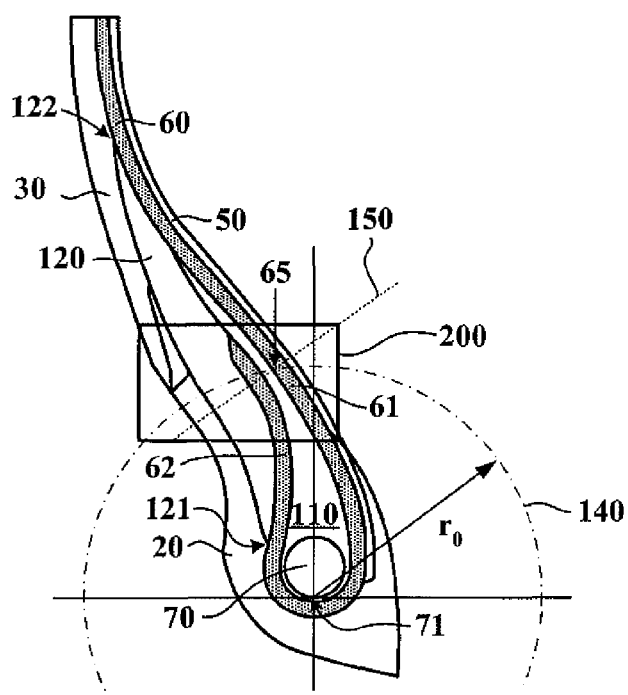
FIGS. 9 and 10 show how the thickness of the assembly formed by the bead filler and the outer band is determined.
Figure 10:
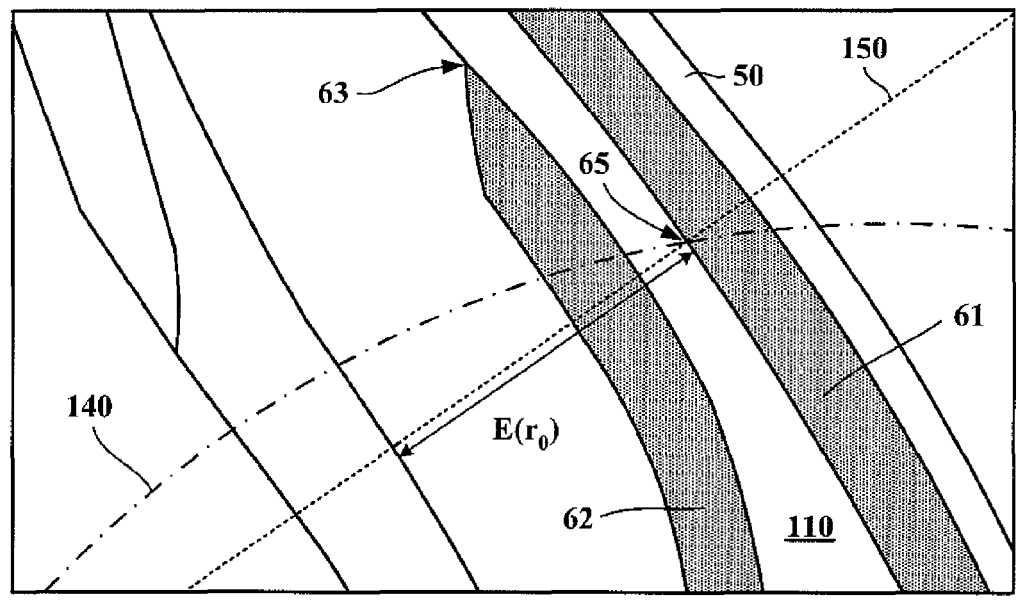

FIGS. 9 and 10 illustrate how the thickness E(r) is measured, with FIG. 10 being an enlargement of the region contained in the box marked 200 in FIG. 9. Consider the interface between the incoming portion 61 of the carcass reinforcement 60 and the bead filler 110. Each point on this interface is at a distance r from the radially innermost point 71 of the annular reinforcing structure 70. If there are several radially innermost points on the annular reinforcing structure, any of these points may be selected as a reference. For a given distance $r_0$, the corresponding point 65 on the interface is found by tracing a circle 140 of radius $r_0$ around the radially innermost point 71 of the annular reinforcing structure 70, as shown in FIG. 9. The direction 150 perpendicular to the incoming portion 61 of the carcass reinforcement 60 which passes through the point 65 of the interface is then traced. The thickness $E(r_0)$ of the assembly formed by the bead filler and outer band corresponds to the length of the intersection of the direction 150 with said assembly. The thickness of the wrapped-around portion 62 is ignored if the direction 150 has an intersection with it.

Figure 11:
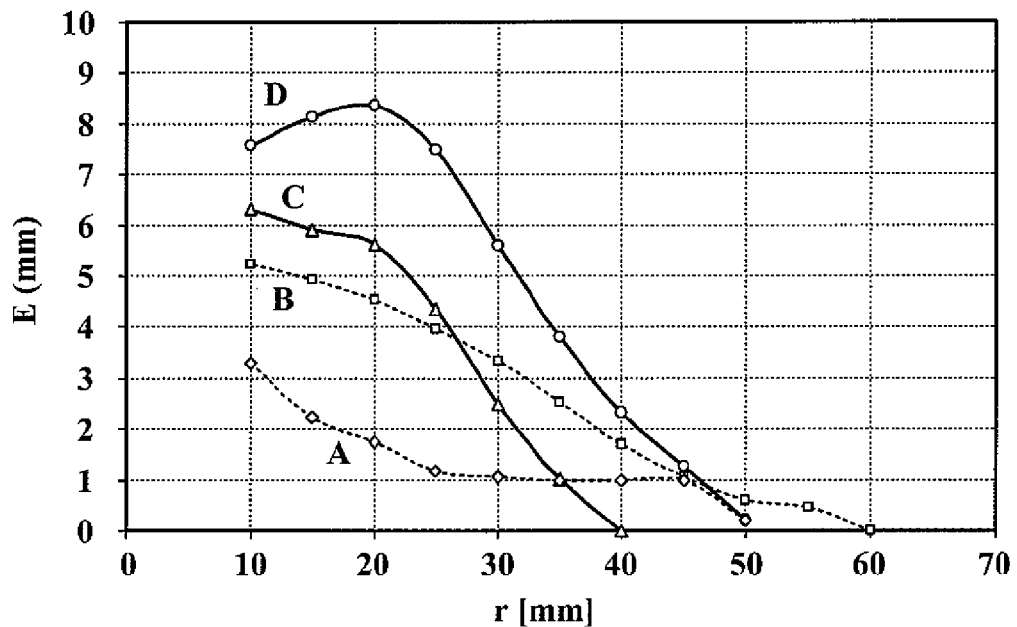
FIGS. 11 and 12 show how the thickness of the assembly formed by the bead filler and the outer band changes as a function of the distance, and its variation.

FIG. 11 shows how the thickness E changes as a function of the distance r for four tire geometries. Geometry "A" (dashes; symbol: lozenge) corresponds to a tire according to the prior art, such as that illustrated in FIG. 3. Geometries "B" (dashes; symbol: square), "C" (solid line; symbol: triangle) and "D" (solid line; symbol: circle) correspond to the tires shown in FIGS. 6 to 8 respectively. In the range of radii from 20 to 50 mm, it will be seen that there is a region where the variation of the thickness is greater for variants "C" and "D". (In the example under consideration, H is equal to 112 mm, which means that the range of distances r from 20 to 50 mm corresponds to values ranging from 17.9% of the radial height H to 44.6% of the radial height H.)

Figure 12:
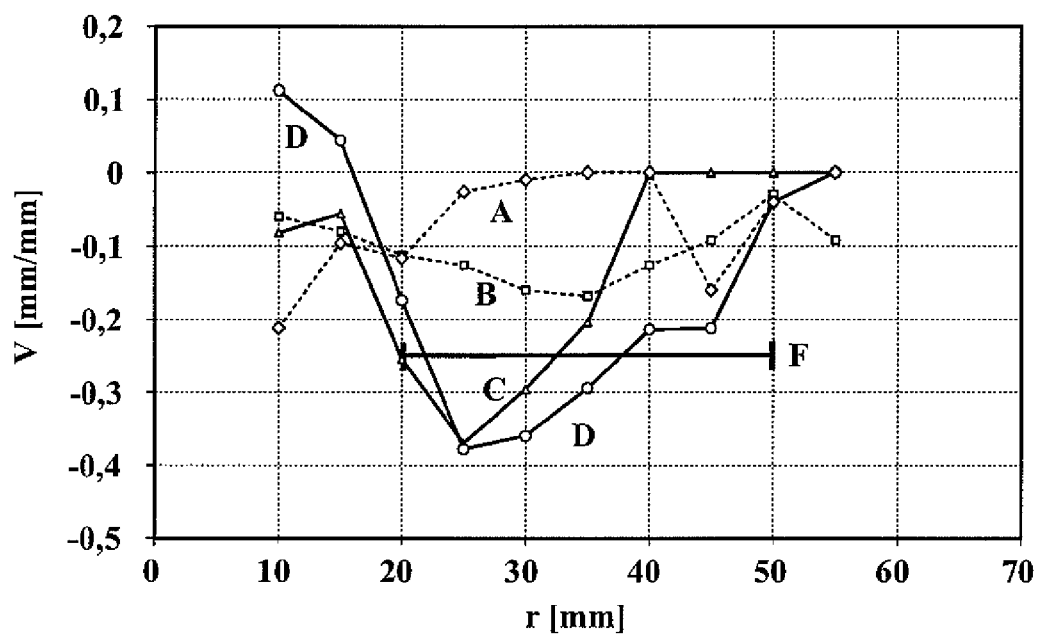

This observation can be quantified if we consider the variation V (which is simply the function $$\frac{\partial E(r)}{\partial r})$$

as a function of the radius r, as shown in FIG. 12. For variants "C" and "D", the thickness E(r) changes as a function of r such that, in the range of distances r from 20 to 50 mm (indicated by reference F), the variation of the thickness $$\frac{\partial E(r)}{\partial r}$$

is less than or equal to −0.25 mm/mm over at least 5 mm. For variant "C", the variation V "culminates" at nearly −0.4 mm/mm; it is less than or equal to −0.25 mm/mm over about 12 mm, and less than or equal to −0.3 mm/mm over about 8 mm. Similarly, for variant "D" the variation V "culminates" at nearly −0.4 mm/mm; it is less than or equal to −0.25 mm/mm over 16 mm, and less than or equal to −0.3 mm/mm over about 12 mm.

A second way to characterize the preferred embodiments is to consider the aspect ratio Emax/DRL, Emax being the maximum width of the assembly formed by the bead filler and the outer band, measured at right angles to the incoming portion of the carcass reinforcement, and DRL being the radial height of the outer band. The rolling resistance is significantly reduced if the aspect ratio Emax/DRL is greater than or equal to 10%.

The values Emax and DRL are indicated for the tires shown in FIGS. 7 and 8. The tire seen in FIG. 7 (in other words variant "C") has an aspect ratio Emax/DRL of 13%, while the tire in FIG. 8 (variant "D") has an aspect ratio Emax/DRL of 15%. For comparison, variant "B" (FIG. 6) has an aspect ratio of 7%.

Figure 13:
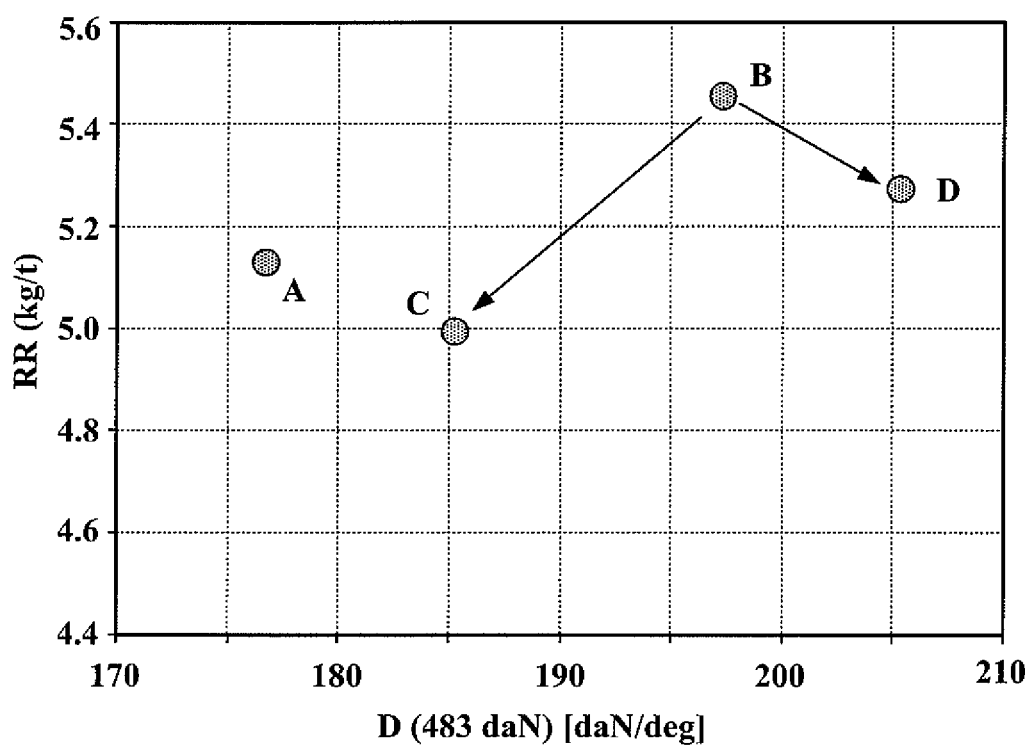
FIG. 13 shows the results obtained with tires according to an embodiment of the invention.

FIG. 13 shows the rolling resistance RR (in kg per ton) of the four variants as a function of the cornering stiffness D of the tire, at a load of 483 daN. Table I summarizes the geometries of the variants tested.

TABLE I

| Variant | Architecture as shown in |
| --- | --- |
| A | FIG. 3 |
| B | FIG. 6 |
| C | FIG. 7 |
| D | FIG. 8 |

We take variant "B" as a reference. As can be seen by comparing it with variant "A", adding an outer band increases the cornering stiffness of the tire and its rolling resistance. Changing the geometry of the outer band (switching from variant "B" to variant "C" or variant "D") reduces rolling resistance. The choice of variant "C" or variant "D" will be guided by the demands of cornering stiffness: if less stiffness is desired, variant "C" will be chosen. If on the other hand high cornering stiffness is desired, variant "D" is preferable.

The invention claimed is:

1. A tire comprising:
two beads configured to be in contact with a wheel rim, each of said two beads comprising at least one annular reinforcing structure;
two sidewalls extending said two beads radially outward, said two sidewalls being joined by a crown comprising a crown reinforcement surmounted by a tread; and
at least one carcass reinforcement extending from said two beads through said two sidewalls to said crown, said at least one carcass reinforcement comprising a plurality of carcass reinforcing elements and being anchored in said two beads by a turn-up around said at least one annular reinforcing structure in such a way as to form in each of said two beads an incoming portion and a wrapped-around portion, each said wrapped-around portion extending radially, outward to an end located at a radial distance DRR from a radially innermost point of said at least one annular reinforcing structure, and said radial distance DRR being greater than or equal to 15% of a radial height H of the tire,
wherein each of said two beads has a bead filler, said bead filler being located radially outside of said at least one annular reinforcing structure and at least partly between said incoming portion and said wrapped-around portion of said at least one carcass reinforcement, said bead filler extending radially outside of said radially innermost point of said at least one annular reinforcing structure as far as a radial distance DRB from said radially innermost point, said radial distance DRB being greater than or equal to 20% of said radial height H of the tire,
wherein each of said two beads also comprises an outer band placed axially outside of both said at least one carcass reinforcement and said bead filler, each said outer band extending radially outward from a radially inner end located at a distance DRI from said radially innermost point of said at least one annular reinforcing structure, as far as a radially outer end, said distance DRI being less than or equal to 20% of said radial height H of the tire, and a radial distance DRL from said radially outer end of said outer band to said radially inner end of said outer band being greater than or equal to 25% of said radial height H of the tire, and
wherein an assembly formed by said bead filler and said outer band has a thickness E(r), this said thickness E(r) corresponding to a length of an intersection of a direction perpendicular to said incoming portion of said at least one carcass reinforcement with said assembly, r being a distance from said intersection of said direction perpendicular to said incoming portion of said at least one carcass reinforcement with said at least one carcass reinforcement to said radially innermost point of said at least one annular reinforcing structure, said thickness E(r) changes as a function of said distance r such that, in a range of distances r greater than or equal to 15% and smaller than or equal to 50% of said radial height H of the tire, a variation V of said thickness E(r) is negative and has an absolute value greater than or equal to 0.3 mm/mm over a distance range of at least 8 mm, where the variation V is defined as a derivative of the thickness E(r) with respect to distance r.

2. The tire according to claim 1, wherein an aspect ratio Emax/DRL is greater than or equal to 10%, where Emax is a maximum width of said assembly formed by said bead filler and said outer band, Emax being measured at right angles to said incoming portion of said at least one carcass reinforcement, and where DRL is a radial height of said outer band.

3. The tire according to claim 1, wherein said bead filler comprises:
a first part of tapered radial section, said first part becoming progressively thinner radially outward before turning into
a second part with a radial section that has an approximately constant width, said second part being located radially outside of said first part and turning into
a third part with a radial section that tapers off, said third part being situated radially outside of said second part.

4. A tire comprising:
two beads configured to be in contact with a wheel rim, each of said two beads comprising at least one annular reinforcing structure;
two sidewalls extending said two beads radially outward, said two sidewalls being joined by a crown comprising a crown reinforcement surmounted by a tread; and
at least one carcass reinforcement extending from said two beads through said two sidewalls to said crown, said at least one carcass reinforcement comprising a plurality of carcass reinforcing elements and being anchored in said two beads by a turn-up around said at least one annular reinforcing structure in such a way as to form in each of said two beads an incoming portion and a wrapped-around portion, each said wrapped-around portion extending radially, outward to an end located at a radial distance DRR from a radially innermost point of said at least one annular reinforcing structure, and said radial distance DRR being greater than or equal to 15% of a radial height H of the tire, wherein each of said two beads has a bead filler, said bead filler being located radially outside of said at least one annular reinforcing structure and at least partly between said incoming portion and said wrapped-around portion of said at least one carcass reinforcement, said bead filler extending radially outside of said radially innermost point of said at least one annular reinforcing structure as far as a radial distance DRB from said radially innermost point, said radial distance DRB being greater than or equal to 20% of said radial height H of the tire, wherein each of said two beads also comprises an outer band placed axially outside of both said at least one carcass reinforcement and said bead filler, each said outer band extending radially outward from a radially inner end located at a distance DRI from said radially innermost point of said at least one annular reinforcing structure, as far as a radially outer end, said distance DRI being less than or equal to 20% of said radial height H of the tire, and a radial distance DRL from said radially outer end of said outer band to said radially inner end of said outer band being greater than or equal to 25% of said radial height H of the tire, and wherein an assembly formed by said bead filler and said outer band has a thickness E(r), this said thickness E(r) corresponding to a length of an intersection of a direction perpendicular to said incoming portion of said at least one carcass reinforcement with said assembly, r being a distance from said intersection of said direction perpendicular to said incoming portion of said at least one carcass reinforcement with said at least one carcass reinforcement to said radially innermost point of said at least one annular reinforcing structure, said thickness E(r) changes as a function of said distance r such that, in a range of distances r greater than or equal to 15% and smaller than or equal to 50% of said radial height H of the tire, the variation V of said thickness E(r) is negative and has an absolute value greater than or equal to 0.25 mm/mm over a distance range of at least 12 mm, where the variation V is defined as a derivative of the thickness E(r) with respect to distance r.

5. A tire comprising:

two beads configured to be in contact with a wheel rim, each of said two beads comprising at least one annular reinforcing structure;

two sidewalls extending said two beads radially outward, said two sidewalls being joined by a crown comprising a crown reinforcement surmounted by a tread; and at least one carcass reinforcement extending from said two beads through said two sidewalls to said crown, said at least one carcass reinforcement comprising a plurality of carcass reinforcing elements and being anchored in said two beads by a turn-up around said at least one annular reinforcing structure in such a way as to form in each of said two beads an incoming portion and a wrapped-around portion, each said wrapped-around portion extending radially, outward to an end located at a radial distance DRR from a radially innermost point of said at least one annular reinforcing structure, and said radial distance DRR being greater than or equal to 15% of a radial height H of the tire, wherein each of said two beads has a bead filler, said bead filler being located radially outside of said at least one annular reinforcing structure and at least partly between said incoming portion and said wrapped-around portion of said at least one carcass reinforcement, said bead filler extending radially outside of said radially innermost point of said at least one annular reinforcing structure as far as a radial distance DRB from said radially innermost point, said radial distance DRB being greater than or equal to 20% of said radial height H of the tire, wherein each of said two beads also comprises an outer band placed axially outside of both said at least one carcass reinforcement and said bead filler, each said outer band extending radially outward from a radially inner end located at a distance DRI from said radially innermost point of said at least one annular reinforcing structure, as far as a radially outer end, said distance DRI being less than or equal to 20% of said radial height H of the tire, and a radial distance DRL from said radially outer end of said outer band to said radially inner end of said outer band being greater than or equal to 25% of said radial height H of the tire, and wherein an assembly formed by said bead filler and said outer band has a thickness E(r), this said thickness E(r) corresponding to a length of an intersection of a direction perpendicular to said incoming portion of said at least one carcass reinforcement with said assembly, r being a distance from said intersection of said direction perpendicular to said incoming portion of said at least one carcass reinforcement with said at least one carcass reinforcement to said radially innermost point of said at least one annular reinforcing structure, said thickness E(r) changes as a function of said distance r such that, in a range of distances r greater than or equal to 15% and smaller than or equal to 50% of said radial height H of the tire, the variation V of said thickness E(r) is negative and has an absolute value greater than or equal to 0.3 mm/mm over a distance range of at least 12 mm, where the variation V is defined as a derivative of the thickness E(r) with respect to distance r.

6. A tire comprising:

two beads configured to be in contact with a wheel rim, each of said two beads comprising at least one annular reinforcing structure;

two sidewalls extending said two beads radially outward, said two sidewalls being joined by a crown comprising a crown reinforcement surmounted by a tread; and at least one carcass reinforcement extending from said two beads through said two sidewalls to said crown, said at least one carcass reinforcement comprising a plurality of carcass reinforcing elements and being anchored in said two beads by a turn-up around said at least one annular reinforcing structure in such a way as to form in each of said two beads an incoming portion and a wrapped-around portion, each said wrapped-around portion extending radially, outward to an end located at a radial distance DRR from a radially innermost point of said at least one annular reinforcing structure, and said radial distance DRR being greater than or equal to 15% of a radial height H of the tire, wherein each of said two beads has a bead filler, said bead filler being located radially outside of said at least one annular reinforcing structure and at least partly between said incoming portion and said wrapped-around portion of said at least one carcass reinforcement, said bead filler extending radially outside of said radially innermost point of said at least one annular reinforcing structure as far as a radial distance DRB from said radially innermost point, said radial distance DRB being greater than or equal to 20% of said radial height H of the tire, wherein each of said two beads also comprises an outer band placed axially outside of both said at least one carcass reinforcement and said bead filler, each said outer band extending radially outward from a radially inner end located at a distance DRI from said radially innermost point of said at least one annular reinforcing structure, as far as a radially outer end, said distance DRI being less than or equal to 20% of said radial height H of the tire, and a radial distance DRL from said radially outer end of said outer band to said radially inner end of said outer band being greater than or equal to 25% of said radial height H of the tire, and wherein an assembly formed by said bead filler and said outer band has a thickness E(r), this said thickness E(r) corresponding to a length of an intersection of a direction perpendicular to said incoming portion of said at least one carcass reinforcement with said assembly, r being a distance from said intersection of said direction perpendicular to said incoming portion of said at least one carcass reinforcement with said at least one carcass reinforcement to said radially innermost point of said at least one annular reinforcing structure, said thickness E(r) changes as a function of said distance r such that, in a range of distances r greater than or equal to 15% and smaller than or equal to 50% of said radial height H of the tire, the variation V of said thickness E(r) is negative and has an absolute value greater than or equal to 0.25 mm/mm over a distance range of at least 16 mm, where the variation V is defined as a derivative of the thickness E(r) with respect to distance r.

7. The tire according to claim 4, wherein an aspect ratio Emax/DRL is greater than or equal to 10%, where Emax is a maximum width of said assembly formed by said bead filler and said outer band, Emax being measured at right angles to said incoming portion of said at least one carcass reinforcement, and where DRL is a radial height of said outer band.

8. The tire according to claim 4, wherein said bead filler comprises:

a first part of tapered radial section, said first part becoming progressively thinner radially outward before turning into a second part with a radial section that has an approximately constant width, said second part being located radially outside of said first part and turning into a third part with a radial section that tapers off, said third part being situated radially outside of said second part.

9. The tire according to claim 5, wherein an aspect ratio Emax/DRL is greater than or equal to 10%, where Emax is a maximum width of said assembly formed by said bead filler and said outer band, Emax being measured at right angles to said incoming portion of said at least one carcass reinforcement, and where DRL is a radial height of said outer band.

10. The tire according to claim 5, wherein said bead filler comprises:

a first part of tapered radial section, said first part becoming progressively thinner radially outward before turning into a second part with a radial section that has an approximately constant width, said second part being located radially outside of said first part and turning into a third part with a radial section that tapers off, said third part being situated radially outside of said second part.

11. The tire according to claim 6, wherein an aspect ratio Emax/DRL is greater than or equal to 10%, where Emax is a maximum width of said assembly formed by said bead filler and said outer band, Emax being measured at right angles to said incoming portion of said at least one carcass reinforcement, and where DRL is a radial height of said outer band.

12. The tire according to claim 6, wherein said bead filler comprises:

a first part of tapered radial section, said first part becoming progressively thinner radially outward before turning into a second part with a radial section that has an approximately constant width, said second part being located radially outside of said first part and turning into a third part with a radial section that tapers off, said third part being situated radially outside of said second part.

* * * * *